US011145155B2

(12) United States Patent
Lopez et al.

(10) Patent No.: US 11,145,155 B2
(45) Date of Patent: *Oct. 12, 2021

(54) VENDING MACHINE AND TRANSPORT CARTRIDGE SYSTEMS AND METHODS

(71) Applicant: 24/7 Pizza Box, LLC, Sarasota, FL (US)

(72) Inventors: Eduardo Lopez, Sarasota, FL (US); Allan L. Cube, Morgan Hill, CA (US); Simon Shue, Newark, CA (US)

(73) Assignee: 24/7 Pizza Box, LLC, Sarasota, FL (US)

(*) Notice: Subject to any disclaimer, the term of this patent is extended or adjusted under 35 U.S.C. 154(b) by 31 days.

This patent is subject to a terminal disclaimer.

(21) Appl. No.: 16/737,160

(22) Filed: Jan. 8, 2020

(65) Prior Publication Data

US 2020/0143623 A1 May 7, 2020

Related U.S. Application Data

(63) Continuation of application No. 15/957,370, filed on Apr. 19, 2018, now Pat. No. 10,546,445.

(51) Int. Cl.
*G07F 11/04* (2006.01)
*G07F 11/72* (2006.01)

(52) U.S. Cl.
CPC .............. *G07F 11/72* (2013.01); *G07F 11/04* (2013.01)

(58) Field of Classification Search
CPC ...................................................... G07F 11/72
(Continued)

(56) References Cited

U.S. PATENT DOCUMENTS 3,866,795 A 2/1975 Urano
4,326,497 A 4/1982 Guibert
(Continued)

FOREIGN PATENT DOCUMENTS

CN 203287987 U 11/2013
WO 2018157987 A1 9/2018

OTHER PUBLICATIONS

International Search Report (ISR) for PCT/US2019/27896 dated Aug. 27, 2019 (5 pages).
(Continued)

*Primary Examiner* — Gene O Crawford
*Assistant Examiner* — Ayodeji T Ojofeitimi
(74) *Attorney, Agent, or Firm* — Shumaker, Loop & Kendrick, LLP

(57) ABSTRACT

A vending machine system for loading and dispensing pre-baked unpackaged food including a fixed cartridge disposed in a refrigerator of a vending machine, and a transport cartridge adapted to removably attach to the fixed cartridge, the transport cartridge operable for holding trays of unpackaged food and loading the trays of unpackaged food from the transport cartridge into the fixed cartridge, wherein, when the transport cartridge is removably attached to the fixed cartridge, a front opening of the transport cartridge aligns with a front opening of the fixed cartridge, and wherein the rack of the transport cartridge aligns with the conveyor system of the fixed cartridge such that trays of unpackaged food within the transport cartridge can simultaneously be transitioned from the rack to the conveyor system.

20 Claims, 14 Drawing Sheets

(58) Field of Classification Search
USPC .................................................. 221/150 HC
See application file for complete search history.

(56) References Cited

U.S. PATENT DOCUMENTS

| | | | |
|---|---|---|---|
| 5,240,139 | A | 8/1993 | Chimomas |
| 5,503,300 | A | 4/1996 | Prescott et al. |
| 5,516,002 | A | 5/1996 | Morillo |
| 5,522,310 | A | 6/1996 | Black, Sr. et al. |
| 6,230,930 | B1 | 5/2001 | Sorensen et al. |
| 6,253,955 | B1 | 7/2001 | Bower |
| 6,513,677 | B1 | 2/2003 | Sorensen et al. |
| 7,137,529 | B2 | 11/2006 | Martinelli et al. |
| 7,647,865 | B2 | 1/2010 | Vidondo |
| 8,651,324 | B2 | 2/2014 | Borghi |
| 10,546,445 | B2 * | 1/2020 | Lopez .................... A21C 15/04 |
| 2001/0002674 | A1 | 6/2001 | Gubbini et al. |
| 2003/0141315 | A1 | 7/2003 | Chirnomas |
| 2004/0026445 | A1 | 2/2004 | Chirnomas |
| 2004/0169048 | A1 | 9/2004 | Simmons |
| 2004/0238557 | A1 | 12/2004 | Chirnomas |
| 2005/0189370 | A1 | 9/2005 | Carter et al. |
| 2006/0196883 | A1 | 9/2006 | Ward |
| 2007/0021866 | A1 | 1/2007 | Coppola et al. |
| 2008/0009963 | A1 | 1/2008 | Simmons |
| 2008/0021595 | A1 | 1/2008 | Chirnomas |
| 2008/0061076 | A1 | 3/2008 | Hieb et al. |
| 2008/0135574 | A1 | 6/2008 | Hieb et al. |
| 2010/0025417 | A1 | 2/2010 | Sjonell |
| 2010/0025422 | A1 | 2/2010 | Bjornvall et al. |
| 2012/0116577 | A1 | 5/2012 | Ottomanelli |
| 2012/0185086 | A1 | 7/2012 | Khatchadourian et al. |
| 2014/0224826 | A1 | 8/2014 | Otzen |
| 2016/0376102 | A1 | 12/2016 | Cook, II et al. |
| 2018/0174392 | A1 | 6/2018 | Jafa et al. |
| 2019/0272699 | A1 | 9/2019 | Mohammed et al. |
| 2019/0325690 | A1 | 10/2019 | Lopez et al. |

OTHER PUBLICATIONS

Written Opinion (WO) for PCT/US2019/27896 dated Aug. 27, 2019 (6 pages).
International Search Report (ISR) for PCT/US2019/27894 dated Jul. 11, 2019 (4 pages).
Written Opinion (WO) for PCT/US2019/27894 dated Jul. 11, 2019 (6 pages).

* cited by examiner

VENDING MACHINE AND TRANSPORT CARTRIDGE SYSTEMS AND METHODS

TECHNICAL FIELD AND BACKGROUND

The present invention relates generally to the field of vending machines for dispensing food items, and more particularly, to a vending machine for dispensing unpackaged food items loaded utilizing a transport cartridge adapted to be loaded off-site with unpackaged food items and loaded on-site into the vending machine without any intermediate handling of the unpackaged food items.

Conventional vending machines for dispensing food items typically include a refrigeration component for preventing spoilage, a heating component for heating food items to a servable temperature, a food handler for transitioning food items within the machine, a dispenser for dispensing the food items, and a transaction component for processing payment.

Conventional vending machines for dispensing food items are typically stocked with factory prepared, pre-packaged foods items, and therefore are incapable of accommodating locally prepared unpackaged food items. Factory prepared food items, while often long-lasting, lack the freshness of locally prepared food and therefore are less desirable to a consumer. Further, vending machines stocked with factory prepared food items require package removal components for removing the food item from the packaging and/or protective film covering prior to heating, which adds cost and complexity to the vending machine.

In an effort to improve food quality, vending machines have been developed that prepare and cook food items "on-demand" using pre-packaged ingredients. While these machines are an improvement in terms of freshness, there are inherent complexities and disadvantages associated with handling ingredients, complex food preparation, and time to prepare the food.

Therefore, to overcome the disadvantages of prior art vending machines for dispensing food items, what is needed is a vending machine configured to dispense locally prepared, unpackaged food items in an efficient and sanitary manner. Such a vending machine would provide local businesses an opportunity to expand locations, increase sales and automate food service, among other advantages.

BRIEF SUMMARY

In one aspect, embodiments of the inventive concepts disclosed herein are directed to a vending machine system adapted to dispense unpackaged food and including a cabinet having a door for accessing a cabinet interior, a refrigerator disposed within the cabinet interior for storing unpackaged food, an oven disposed within the cabinet interior for heating unpackaged food to a servable temperature, at least one delivery chute for delivering heated unpackaged food, a payment system for processing customer payments, an interface for operating the vending machine system, a fixed cartridge disposed within the refrigerator, the fixed cartridge comprising a conveyor system for conveying trays of unpackaged food within the fixed cartridge, and a transport cartridge for loading trays of unpackaged food into the fixed cartridge, the transport cartridge adapted to removably attach to the fixed cartridge such that trays of unpackaged food in the transport cartridge are aligned with the conveyor system to transfer trays of unpackaged food from the transport cartridge to the conveyor system.

In another aspect, the fixed cartridge may include a housing having a front opening, a door, and a drive mechanism for driving the conveyor system.

In a further aspect, the transport cartridge may include a housing having a front opening, an interior rack for holding trays of unpackaged food, and a door covering the front opening of the housing.

In a further aspect, the transport cartridge may include a rotating dowel disposed adjacent a top of the housing on which the panel door is wound when retracting the panel door.

In a further aspect, at least a portion of a back wall of the housing of the transport cartridge may be movable in a direction of the front opening of the housing to simultaneously transfer trays of unpackaged food in the transport cartridge into the fixed cartridge.

In a further aspect, the vending machine system may further include a pusher for ejecting a tray of unpackaged food from within the fixed cartridge to a position exterior of the fixed cartridge.

In a further aspect, the fixed cartridge may include at least one alignment feature adapted to be received in a corresponding alignment receiver of the transport cartridge, and the transport cartridge may include at least one alignment feature adapted to be received in at least one alignment receiver disposed along a top of the fixed cartridge.

In a further aspect, the transport cartridge may include a removable back cover.

In a further aspect, the transport cartridge may be adapted to be loaded with unpackaged food at a location remote from the cabinet.

In another embodiment, the inventive concepts disclosed herein are directed to a system for loading and dispensing pre-baked unpackaged food including a fixed cartridge adapted to be disposed in a refrigerator of a vending machine, the fixed cartridge including a conveyor system for conveying trays of unpackaged food within the fixed cartridge, and a drive mechanism for driving the conveyor system, and a transport cartridge adapted to removably attach to the fixed cartridge, the transport cartridge including a housing, a rack for holding trays of unpackaged food, and a mechanism for transitioning the trays of unpackaged food from within the transport cartridge into the fixed cartridge, wherein, when the transport cartridge is removably attached to the fixed cartridge, a front opening of the transport cartridge aligns with a front opening of the fixed cartridge, and wherein the rack of the transport cartridge aligns with the conveyor system of the fixed cartridge such that trays of unpackaged food within the transport cartridge can simultaneously be transitioned from the rack to the conveyor system.

In a further aspect, a total tray capacity of the transport cartridge may be less than a total tray capacity of the fixed cartridge.

In a further embodiment, the inventive concepts disclosed herein are directed to a method for stocking a vending machine adapted to dispense unpackaged food, including the steps of providing a vending machine including a fixed cartridge disposed in a refrigerator of the vending machine, the fixed cartridge including a conveyor system for conveying trays of unpackaged food within the fixed cartridge, and a drive mechanism for driving the conveyor system, providing a transport cartridge adapted to removably attach to the fixed cartridge, the transport cartridge including a housing, a rack for holding trays of unpackaged food, and a mechanism for transitioning the trays of unpackaged food from within the transport cartridge into the fixed cartridge, stocking the transport cartridge with trays of unpackaged food at a location remote from a location of the vending machine, delivering the stocked transport cartridge to the location of the vending machine, attaching the stocked transport cartridge to the fixed cartridge such that a front opening of the transport cartridge aligns with a front opening of the fixed cartridge, and such that the rack of the transport cartridge aligns with the conveyor system of the fixed cartridge such, transferring trays of unpackaged food from the rack to the conveyor system, and detaching the transport cartridge from the fixed cartridge.

In another aspect, the method includes the further step of, subsequent to the step of attaching the transport cartridge to the fixed cartridge, retracting a door covering the front opening of the transport cartridge.

In a further aspect, the method includes the further step of, prior to the step of attaching the transport cartridge to the fixed cartridge, the steps of opening a vending machine door to access the refrigerator and opening a refrigerator door to access the fixed cartridge.

In a further aspect, the method includes the further step of attaching the transport cartridge to the fixed cartridge by engaging an alignment feature on the transport cartridge with an alignment receiver on the fixed cartridge.

In a further aspect, the step of transferring trays of unpackaged food from the rack to the conveyor system may include simultaneously transferring the trays.

Embodiments of the inventive concepts can include one or more or any combination of the above aspects, features and configurations.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

Figure 1:
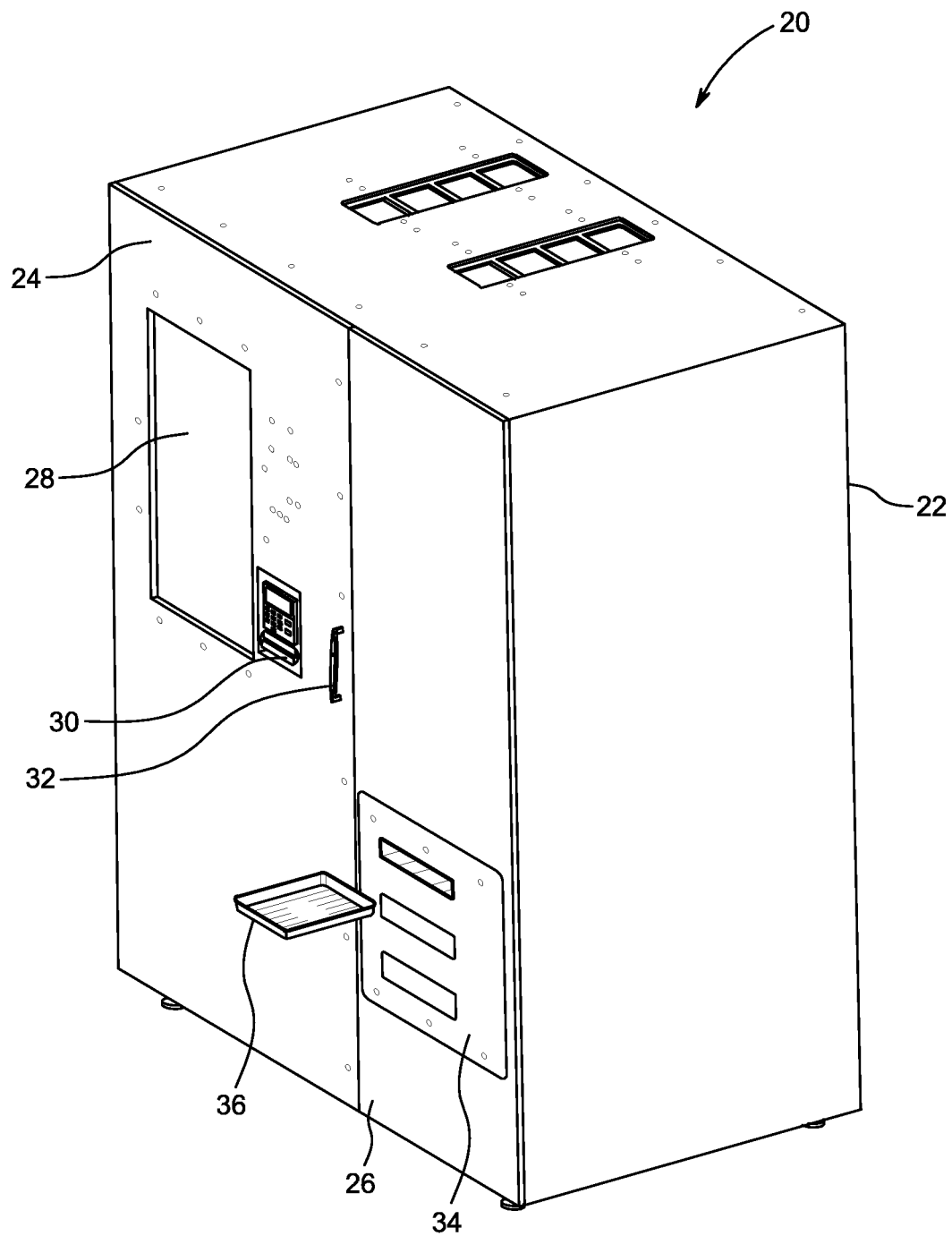
FIG. 1 is a front perspective view of a vending machine according to an embodiment of the invention.

The inventive concepts are described hereinafter with reference to the accompanying drawings in which exemplary embodiments are shown. However, the inventive concepts may be embodied in many different forms and should not be construed as limited to the representative embodiments set forth herein.

The inventive concepts disclosed herein are generally directed vending machines for dispensing fresh, unpackaged food items. In an exemplary embodiment, the vending machine may be an automated kiosk configured to dispense fresh, pre-baked pizza slices to customers. The vending machine generally includes a temperature-controlled refrigeration unit for storing pre-baked pizza slices, and a high-performance electric conveyor oven for heating the pizza slices on-demand to a servable temperature. The pizza slices may be delivered utilizing one or more pushers, sliders, elevators and conveyors, and an exit chute for delivery. In exemplary capacities, the vending machine may hold up to 72 or 108 fresh pizza slices. The vending machine may further include a touchscreen display, optionally a camera to capture images of customers interacting with the vending machine, and a payment subsystem operable to accept credit card payments as well as near field communication (NFC) payment, examples of which include, but are not limited to, Apple Pay™, Google Wallet™ and Softcard™. The vending machine may be configured with multiple delivery chutes to deliver pizza slices at a servable temperature. The vending machine may utilize a power subsystem for the creation and distribution of AC and DC voltages derived from 240 VAC and 60 Amps.

In one aspect, the inventive concepts disclosed herein are directed to a method for loading or stocking pre-baked unpackaged pizza slices or other food items into the refrigeration unit, and may include the steps of: (1) optionally powering down the vending machine; (2) accessing and opening the refrigerator door and removing all expired/unsold pizza slices; (3) removing the transport protective covering where applicable; (4) attaching the transport cartridge to the fixed cartridge disposed in the refrigerator; (5) opening the door of the fixed cartridge where applicable; (6) opening the door of the transport cartridge; (7) transferring, for example by pushing, the trays of pizza slices from the transport cartridge into the fixed cartridge; (8) closing the door of the fixed cartridge where applicable; (9) detaching the transport cartridge from the fixed cartridge; (10) lowering the predetermined number of trays down to the bottom of the fixed cartridge; and (11) repeating steps (3)-(10) to load trays of pizza slices until each fixed cartridge is at a desired or full capacity.

In another aspect, the inventive concepts disclosed herein are further directed to a method for ordering a pizza slice utilizing the touchscreen, the method including the steps of: (1) activating the touchscreen and selecting a flavor of pizza slice; (2) determining the availability of the selected flavor of pizza slice; (3) upon confirmation of availability prompting payment, and upon confirmation of unavailability reverting back to slice flavor selection; (4) requiring payment; (5)

selecting an offered mode of payment; (6) calculating and confirming payment; (6) pizza slice processing; (7) transitioning the pizza slice from the refrigerator to the conveyor; (8) conveying the pizza slice to the oven; (9) displaying live processing and estimated time remaining for delivery (e.g., 2 minutes 30 seconds from the start of processing to delivery); (10) heating the pizza slice; (11) conveying the heated pizza slice to a predetermined delivery chute; (12) displaying to the customer a prompt to collect the heated pizza slice from the predetermined delivery chute; and (13) collecting the pizza slice from the predetermined delivery chute.

To achieve the above objects and aspects, FIG. 1 illustrates a vending machine adapted to dispense pre-baked unpackaged food generally at reference numeral 20. The vending machine 20 includes a cabinet 22 having a main door 24 and a service door 26. The main door 24 is opened to access at least the internal refrigerator, as well as various other internal components for servicing. A touchscreen user interface 28 may be mounted within the main door 24. The touchscreen user interface 28 may be a capacitance or resistive touchscreen operable for inputting customer selections, displaying information, programming the vending machine, etc. Adjacent the touchscreen user interface is a payment subsystem 30 including card reader functionality and near field communication readability, among other functionality. The main door 24 may be equipped with a handle and lock 32 operable for accessing the interior of the vending machine. The vending machine 20 further includes a delivery chute subassembly 34 for dispensing food trays 36 to customers. The vending machine 20 may include additional features such as leveling feet and rolling casters. The exterior can be branded or otherwise customized for each different owner/operator.

At least one of the touchscreen user interface 28 and the payment subsystem 30 may be communicatively coupled and may include a digital computer that, in terms of hardware architecture, generally includes a processor, input/output (I/O) interfaces, a network interface, a data store, and memory. A processor/controller may control the touchscreen, inventory management, and payment subsystems, among other components. It should be appreciated by those of ordinary skill in the art that a practical embodiment of a computer may include additional components and suitably configured processing logic to support known or conventional operating features that are not described in detail herein. The components may be communicatively coupled via a local interface. The local interface may be, for example but not limited to, one or more buses or other wired or wireless connections, as is known in the art. The local interface may have additional elements, which are omitted for simplicity, such as controllers, buffers (caches), drivers, repeaters, and receivers, among many others, to enable communications. Further, the local interface may include address, control, and/or data connections to enable appropriate communications among the aforementioned components.

The controller/processor may be a hardware device for executing software instructions. The controller/processor may be any custom made or commercially available processor, a central processing unit (CPU), an auxiliary processor among several processors associated with the server, or generally any device for executing software instructions. The controller/processor may be configured to execute software stored within the memory, to communicate data to and from the memory, and to generally control operations of the server pursuant to the software instructions. The I/O interfaces may be used to receive user input from and/or for providing system output to one or more system devices or components. User input may be provided via, for example, the touchscreen. System output may also be provided via the touchscreen. I/O interfaces may include, for example, a serial port, a parallel port, a small computer system interface (SCSI), a serial ATA (SATA), a fiber channel, Infiniband, iSCSI, a PCI Express interface (PCI-x), an infrared (IR) interface, a radio frequency (RF) interface, and/or a universal serial bus (USB) interface.

The network interface may be used to enable the server to communicate on a network, such as the Internet, a wide area network (WAN), a local area network (LAN), and the like, etc. The network interface may include address, control, and/or data connections to enable appropriate communications on the network. A data store may be used to store data. The data store may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. In one example, the data store may be located internal to the server such as, for example, an internal hard drive connected to the local interface in the server. Additionally, in another embodiment, the data store may be located external to the server such as, for example, an external hard drive connected to the I/O interfaces (e.g., SCSI or USB connection). In a further embodiment, the data store may be connected to the server through a network, such as, for example, a network attached file server. The memory may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. The memory may have a distributed architecture where various components are accessed by the controller/processor. The software in memory may include one or more software programs, each of which includes an ordered listing of executable instructions for implementing logical functions. The software in the memory may include a suitable operating system (O/S) and one or more programs. The operating system essentially controls the execution of other computer programs, such as the one or more programs, and provides scheduling, input-output control, file and data management, memory management, and communication control and related services. The one or more programs may be configured to implement the various processes, algorithms, methods, techniques, etc. described herein.

Figure 2:
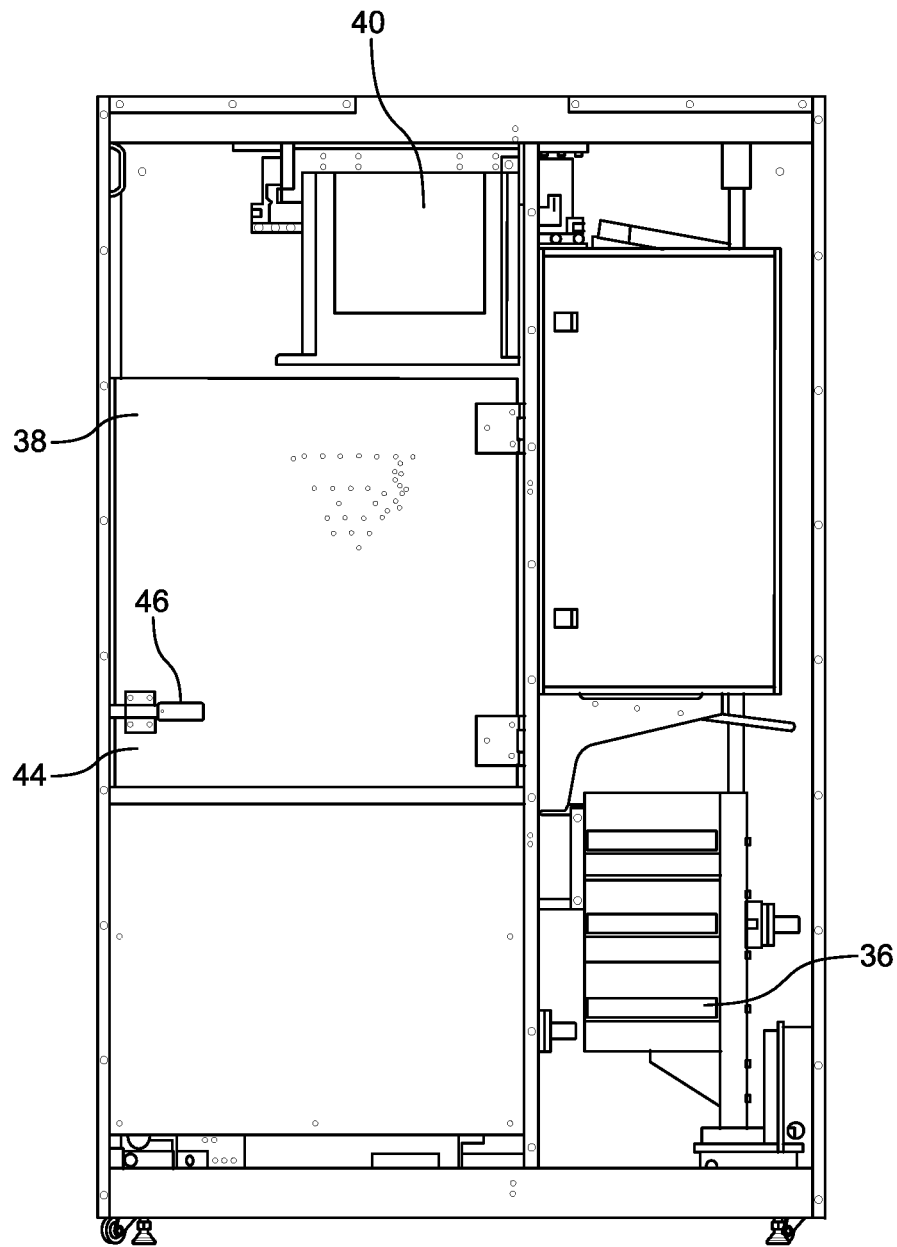
FIG. 2 is a front view of the vending machine, showing the front door or doors removed.
Figure 3:
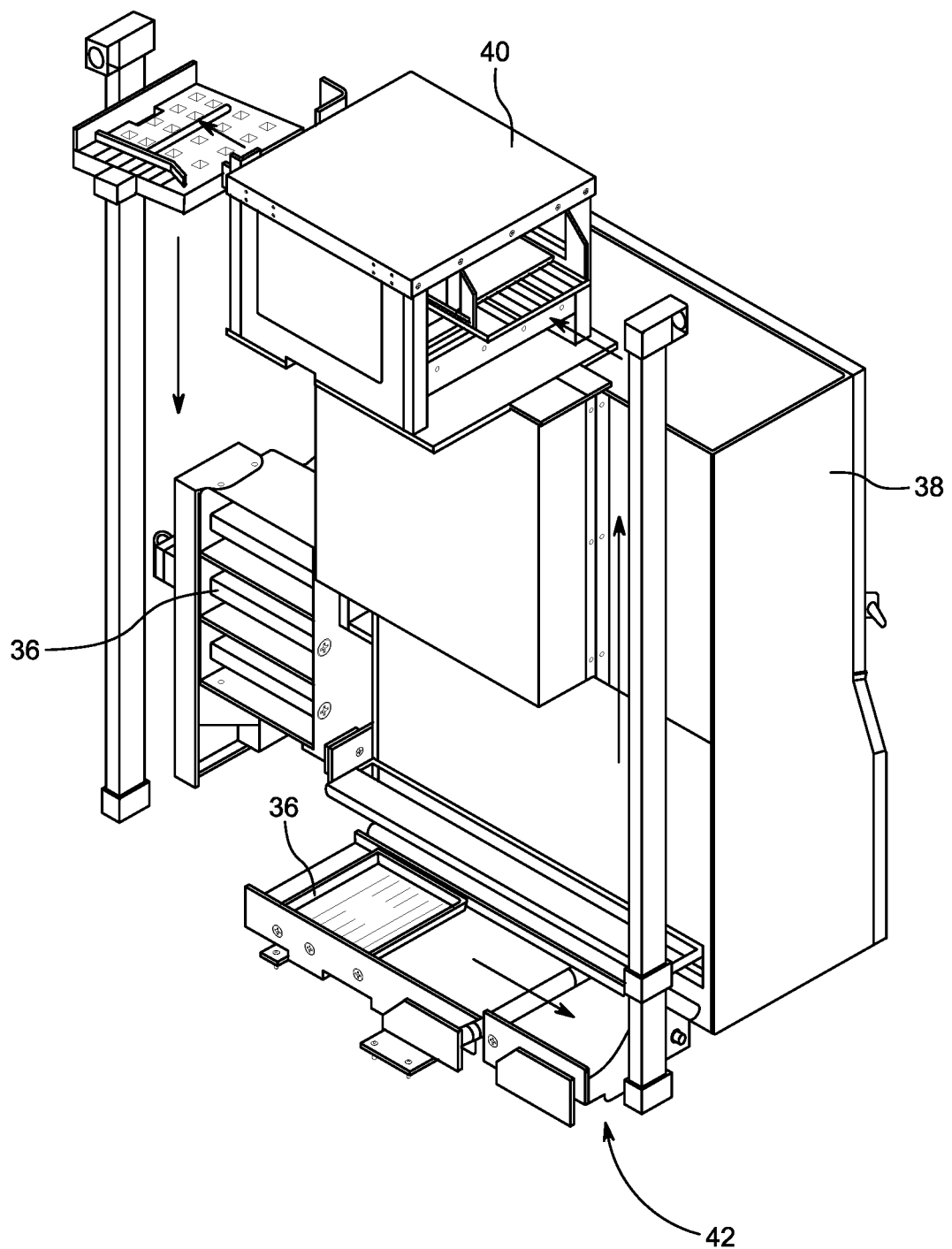
FIG. 3 is a perspective view of the internal components of the vending machine, shown removed from the vending machine.

Referring to FIGS. 2 and 3, the internal components of the vending machine 20 generally include, but are not limited to, a refrigerator 38, a conveyor oven 40, and an arrangement of elevators, pushers, conveyors, etc. 42 for transitioning the trays 36 within the machine. The refrigerator door 44 may be equipped with a handle 46 for manipulating the main door. The vending machine 20 can include additional components including, but not limited to, thermal ducting, fans/blowers, power supplies, cabling, lighting, and insulation. Referring specifically to FIG. 3, the directional arrows indicate an exemplary tray conveyance pathway within the machine from the refrigerator to the conveyor to the exit chute.

Figure 4:
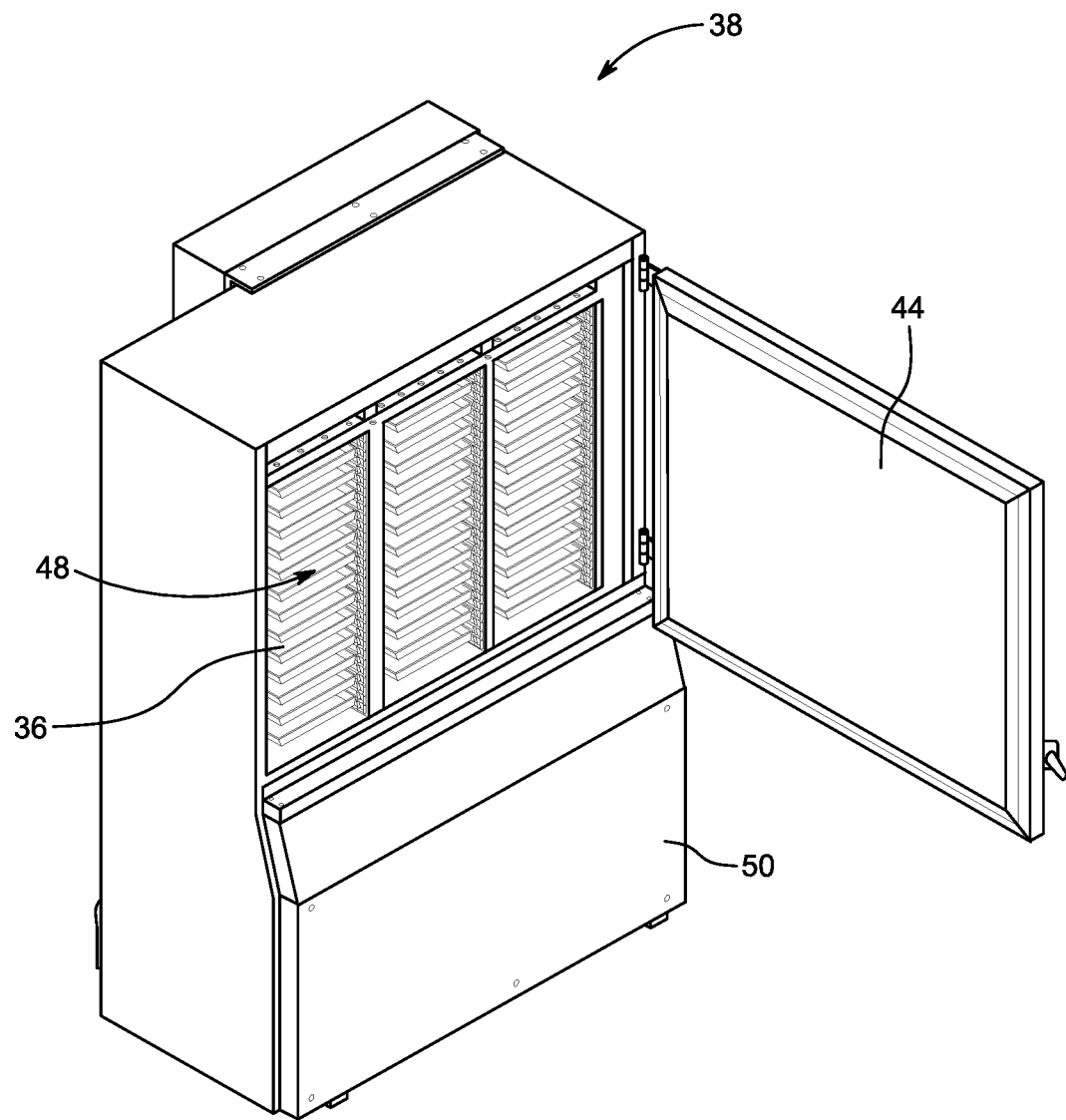
FIG. 4 is a perspective view of the refrigerator, showing the main refrigerator door open and internal fixed cartridges.

Referring to FIG. 4, an exemplary embodiment of a refrigerator is shown generally at reference numeral 38. Aside from conventional componentry such as a heat pump and thermal insulation, the refrigerator 38 includes the main door 44 opened to access the refrigerator interior compartment. Housed within the refrigerator interior component is at least one fixed cartridge 48. As discussed in detail below, each fixed cartridge 48 is generally operable for receiving and storing vertically-stacked trays 36 of unpackaged food and conveying the trays 36 within the fixed cartridge to an exit of the fixed cartridge on demand. As shown, the fixed cartridge configuration includes three fixed cartridges 48 in a side-by-side arrangement with each having a predetermined tray-holding capacity. In a non-limiting example, the refrigerator houses two fixed cartridges each accommodating 36 trays of unpackaged food, for a total fixed machine tray capacity of 72 trays of unpackaged food. The fixed cartridges 48 are arranged side-by-side with a front opening of each fixed cartridge oriented facing the main door 44 such that the front opening of each fixed cartridge is accessible when the main door 44 is open. The refrigerator may further include a secondary door 50 for accessing other areas of the fixed cartridges and/or conveyor driving mechanisms associated with the fixed cartridges.

Figure 5:
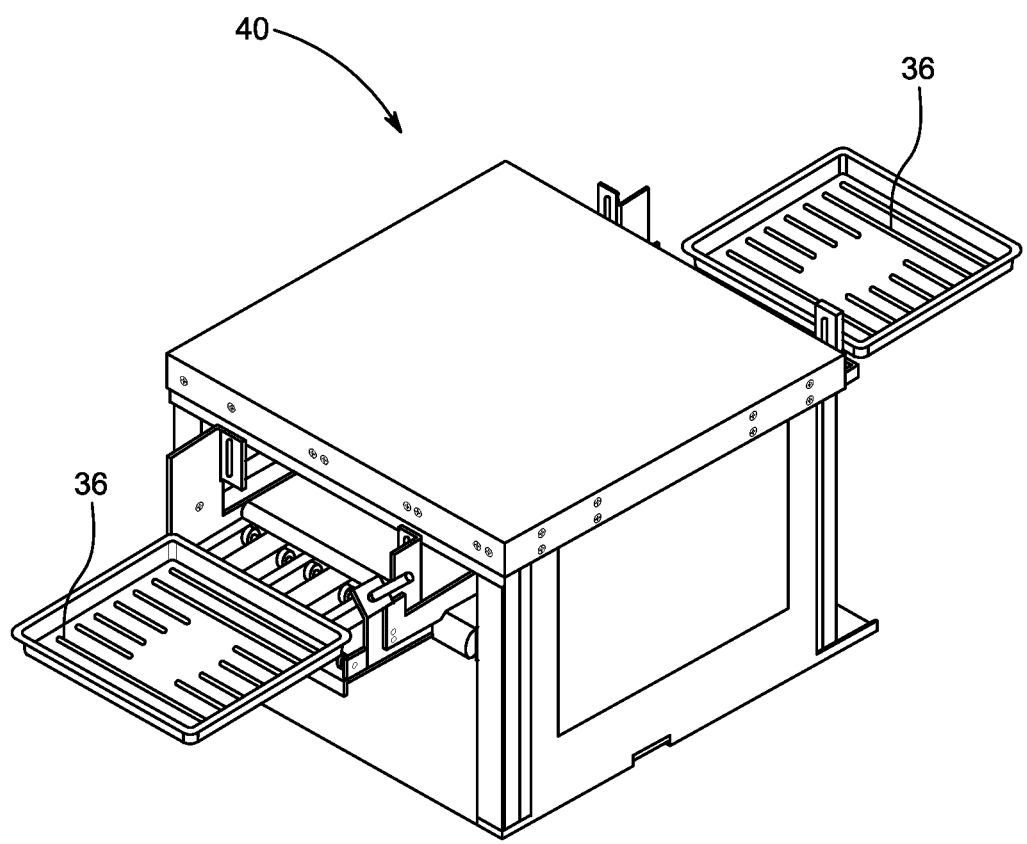
FIG. 5 is a perspective view of a conveyor oven.

Referring to FIG. 5, an exemplary high-performance electric conveyor oven for heating the unpackaged food on-demand to a servable temperature is shown generally at reference numeral 40. Trays 36 holding unpackaged food, for example a single pizza slice, are conveyed from the refrigerator to the conveyor oven, where the unpackaged food is heated to the predetermined servable temperature before being conveyed to the exit chute subassembly. The unpackaged food may be heated and served on the same tray as delivered to the vending machine or may be heated on another tray or without a tray.

Figure 6:
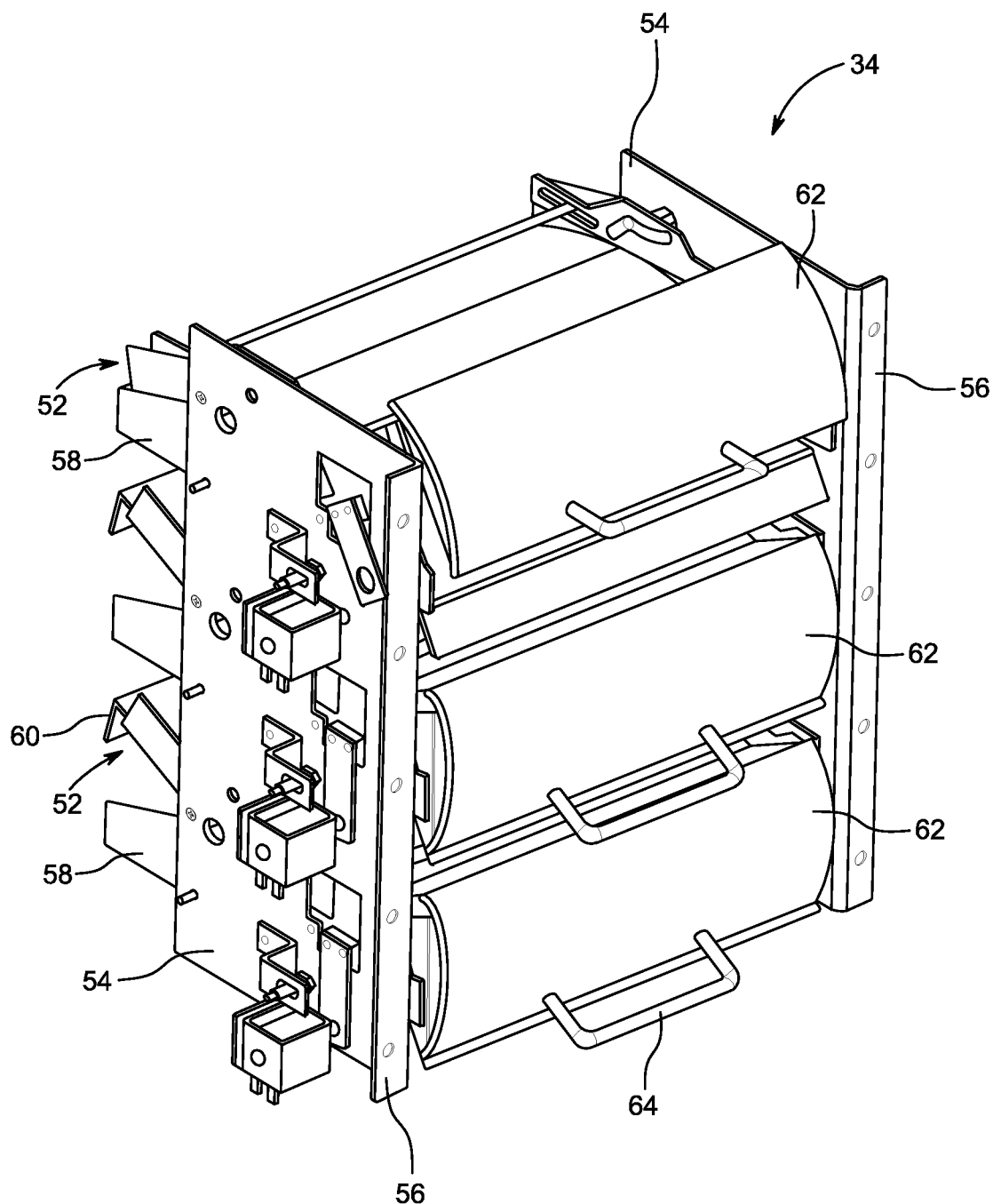
FIG. 6 is a front perspective view of a food dispensing chute assembly.
Figure 7:
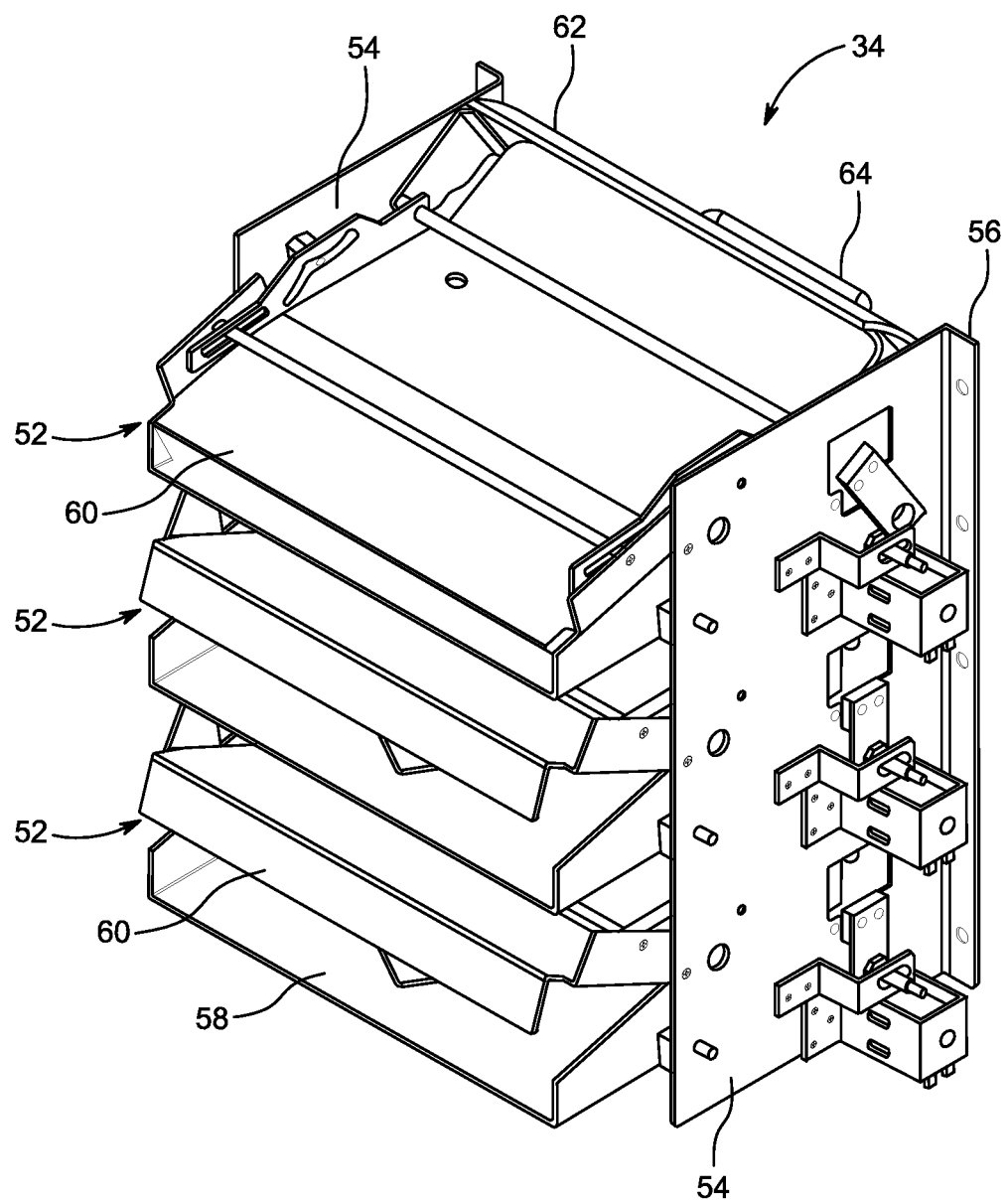
FIG. 7 is a rear perspective view of the food dispensing chute assembly.

Referring to FIGS. 6 and 7, an exemplary dispensing chute subassembly is shown generally at reference numeral 34. The dispensing chute subassembly 34 generally includes a plurality of chutes 52 each operable for dispensing heated unpackaged food served on the tray. The chutes 52 are mounted between a pair of parallel sidewalls 54 each having a front flange 56 adapted to mount to the inside face of the cabinet. Each chute 52 generally includes a shelf 58 upon which the trayed unpackaged food is placed for delivery, a shelf cover 60 movable relative to the shelf, and a delivery door 62 operably connected to the shelf cover 60. In operation, when the delivery door 62 is closed, the shelf cover 60 is lifted above the shelf 58 such that a tray handler has access to the shelf from the backside as illustrated in the bottom two chutes 52. When the delivery door 62 is opened, the shelf cover 60 closes on the shelf 58 such that the customer has access to the food item on the shelf while prevented from reaching beyond the shelf into the machine as illustrated in the top chute 52. Thus, the delivery door 62 is operatively linked to the shelf cover 60 such that delivery door movement drives shelf cover movement. As such, the customer is unable to reach into the inside of the machine regardless of whether the shelf 58 is loaded or unloaded. Each delivery door 62 can be equipped with a handle 64 for manually opening and closing the delivery door.

Figure 8:
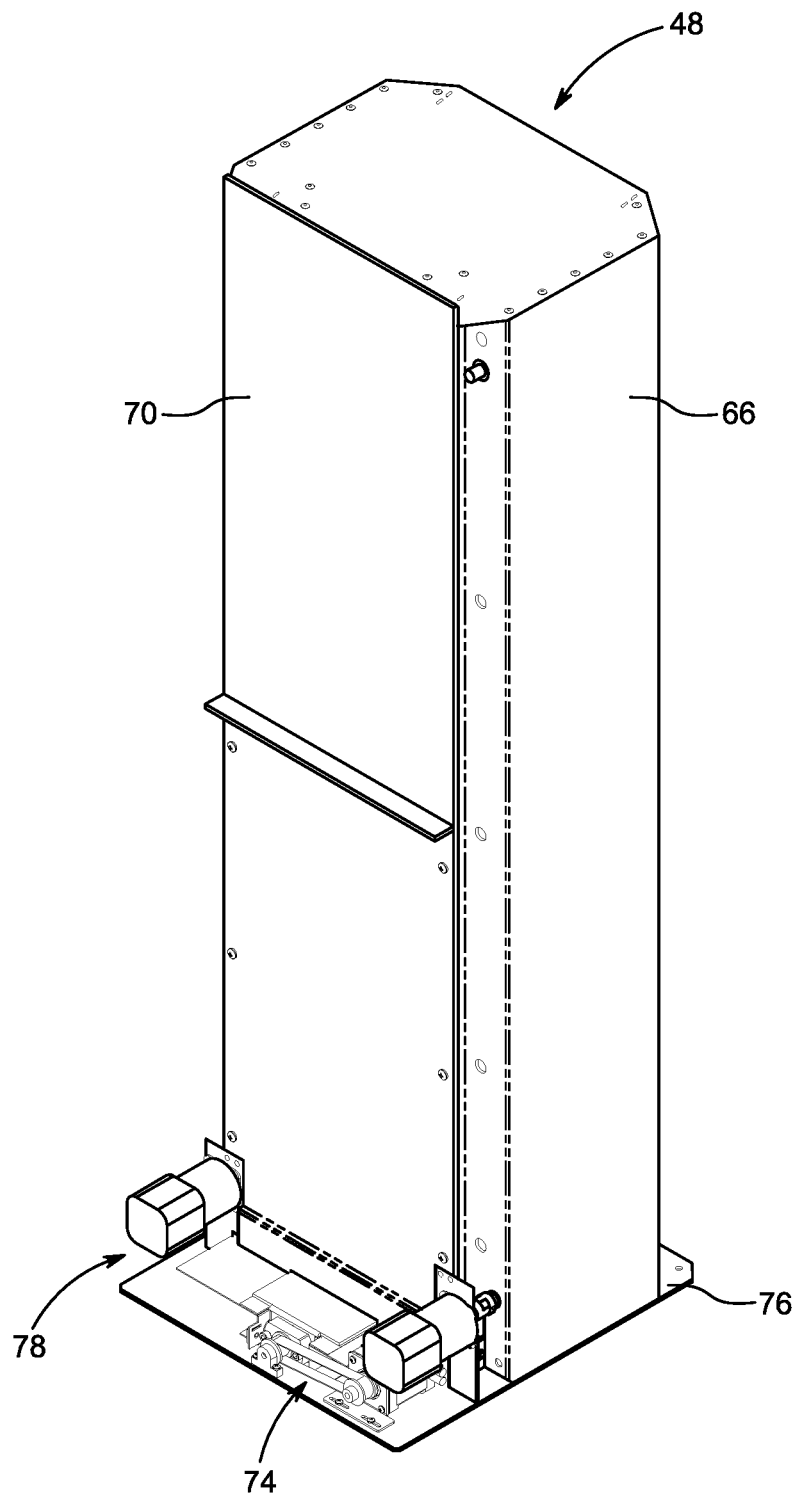
FIG. 8 is a front perspective view of a fixed cartridge.
Figure 9:
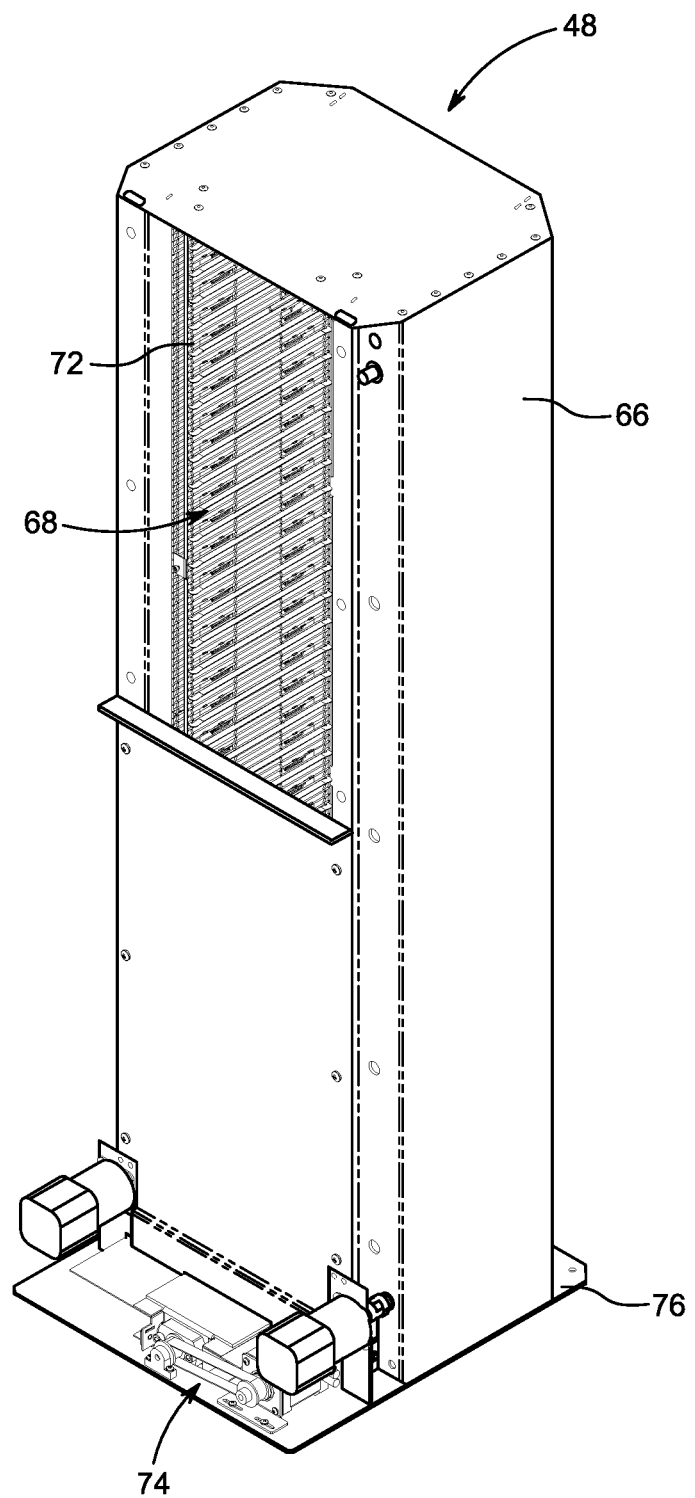
FIG. 9 is a front perspective view of the fixed cartridge, showing the front door removed.
Figure 10:
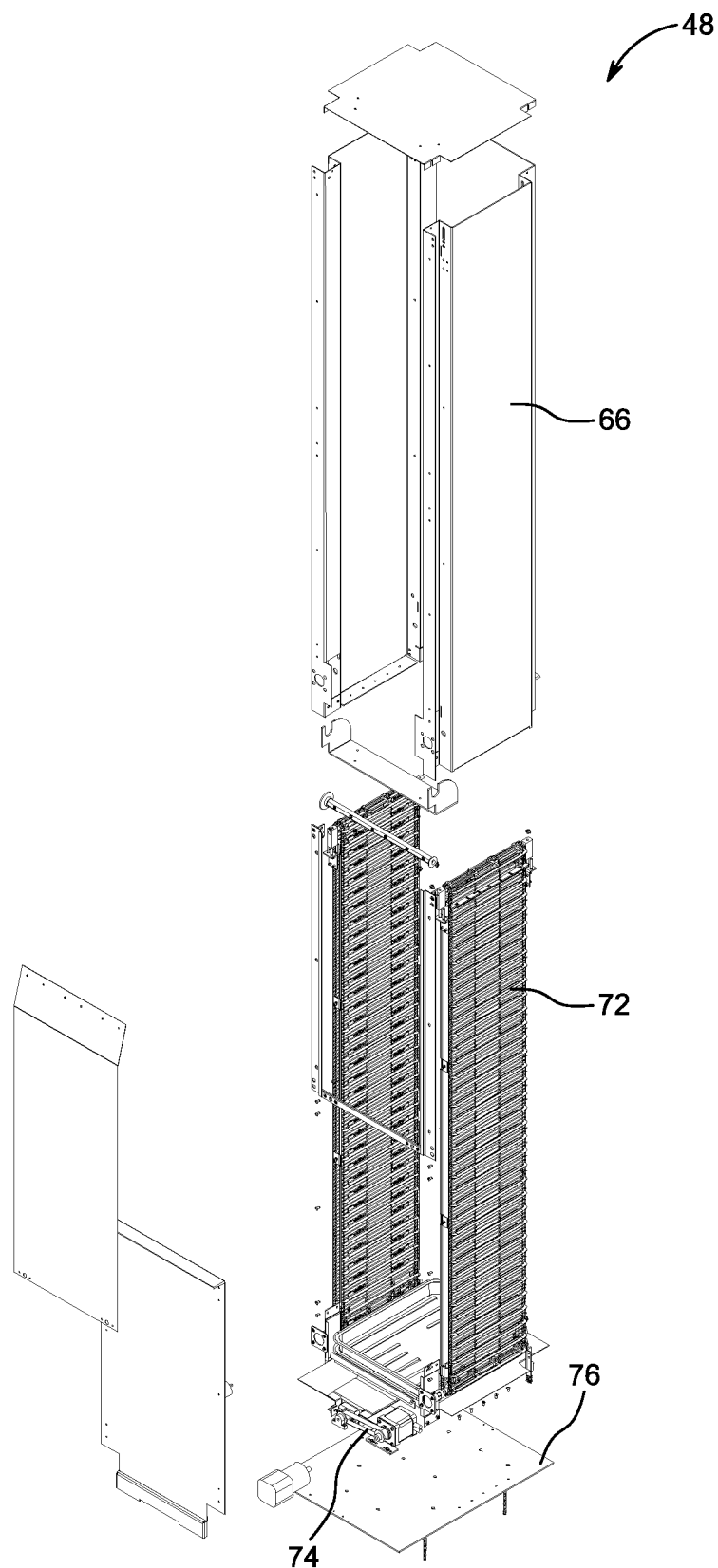
FIG. 10 is an exploded view of the fixed cartridge.

Referring to FIGS. 8-10, an exemplary fixed cartridge is shown generally at reference numeral 48. Each fixed cartridge 48 is housed within the refrigerator and generally includes a housing 66 having a front opening 68, at least one door 70, a conveyor system 72, and a drive mechanism 74 for driving the conveyor system. The housing 66 may be mounted on a base 76 adapted to be secured to the refrigerator floor. The drive mechanism drives conveyor movement to convey trays of unpackaged food within the fixed cartridge, for example, in a direction toward the bottom of the fixed cartridge. Conveyor belts, chains, or the like may be symmetrically arranged on opposite sides of the interior and cooperate to stably transition a tray toward the bottom of the fixed cartridge to an exit where a pusher 78 operates to transition a tray from within the fixed cartridge to a position outside of the fixed cartridge, for example, to be conveyed to the conveyor oven.

Figure 11:
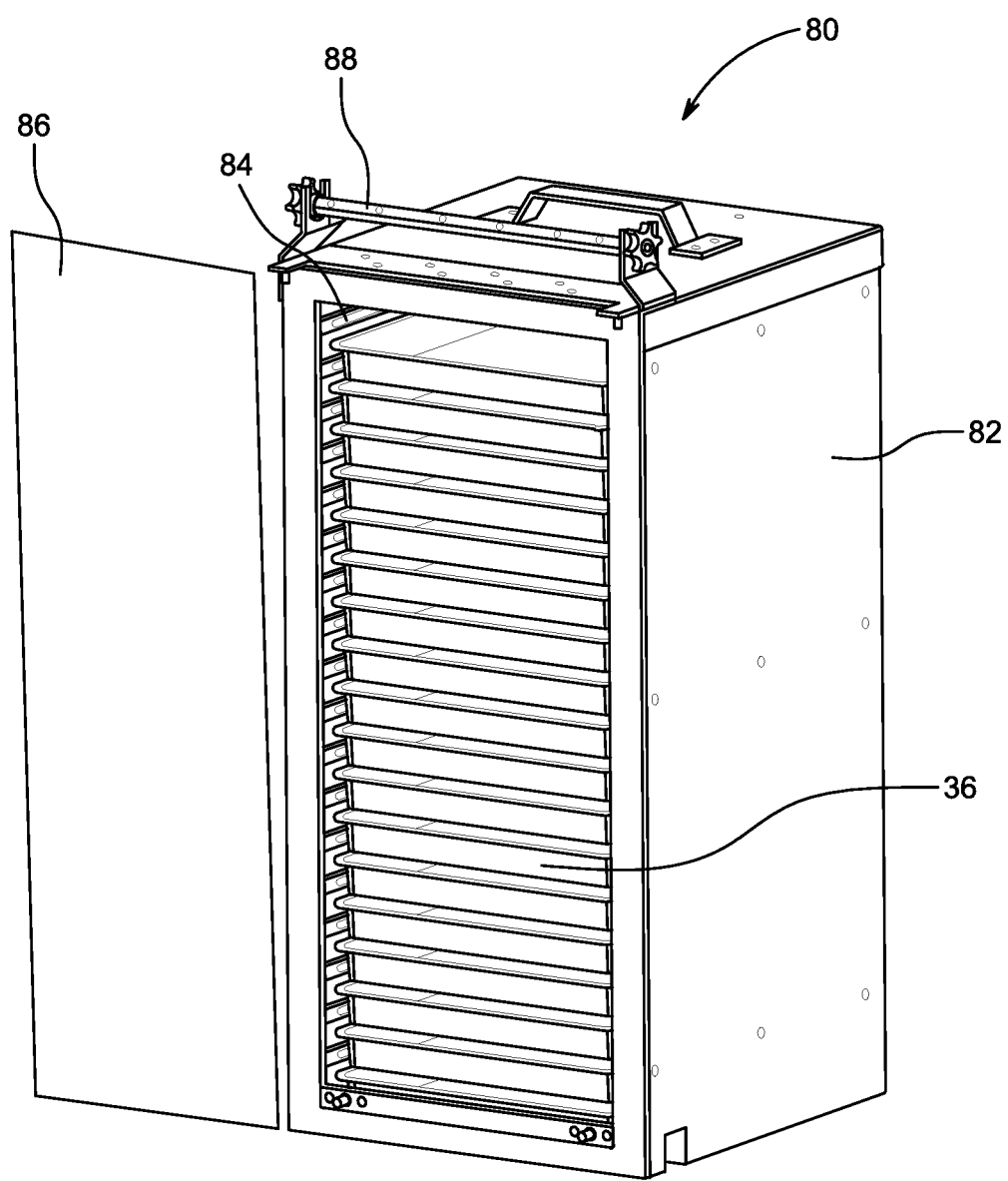
FIG. 11 is front perspective view of a transport cartridge, showing the front door removed.
Figure 12:
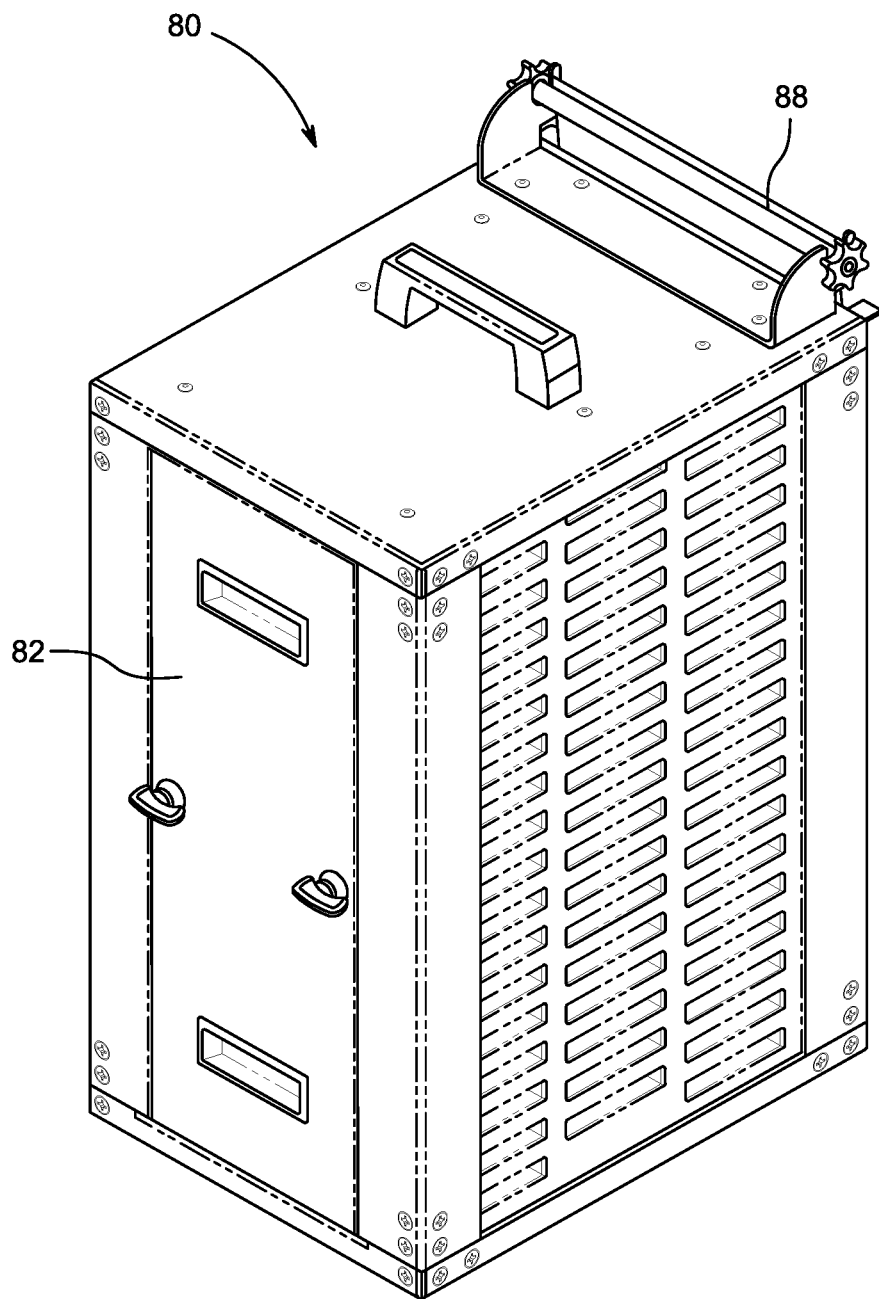
FIG. 12 is a rear perspective view of the transport cartridge.
Figure 13:
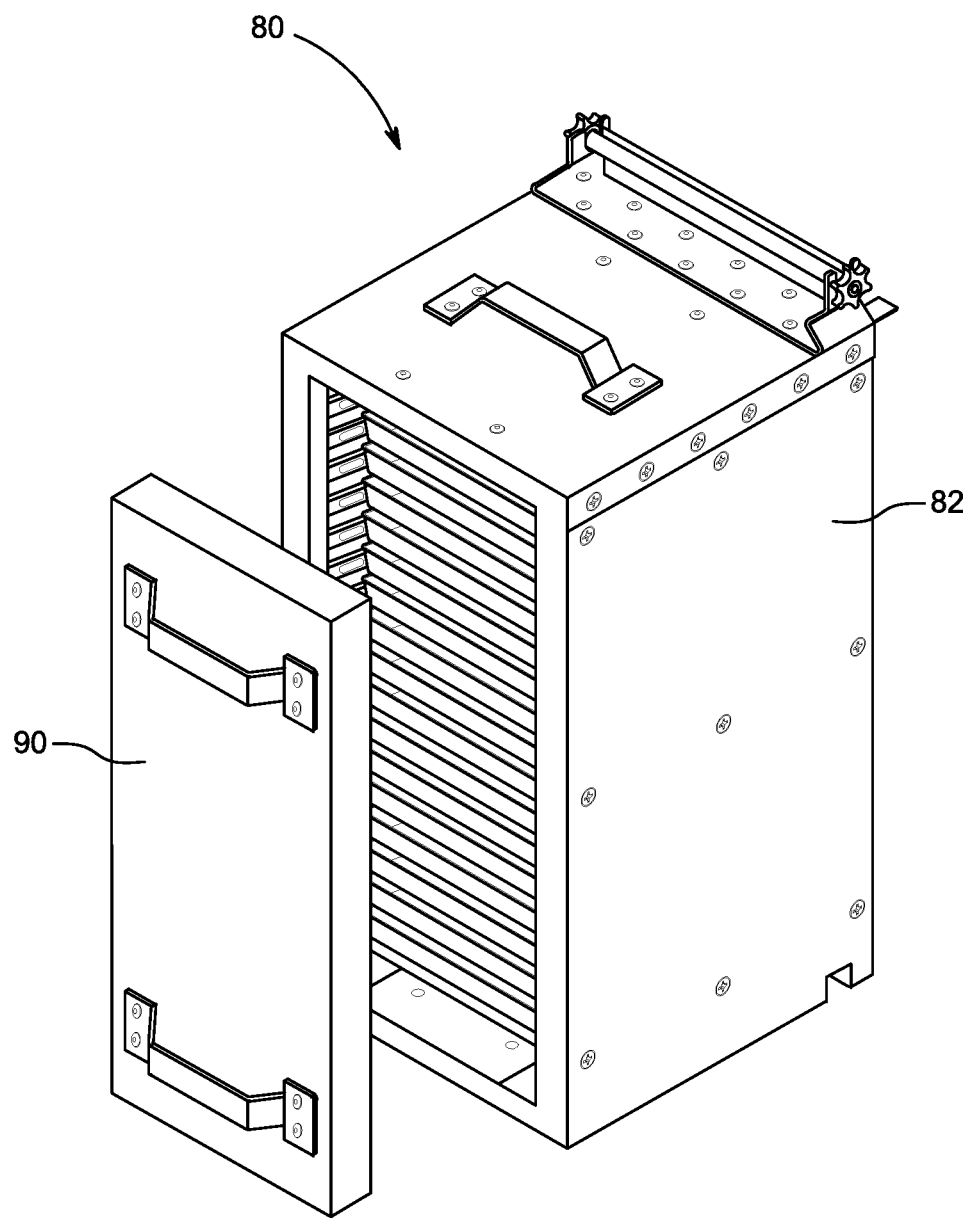
FIG. 13 is a rear perspective view of the transport cartridge, showing the back cover removed.

Referring to FIGS. 11-13, embodiments of transport cartridges are shown generally at reference numeral 80. The transport cartridge 80 generally operates to load or stock trays of unpackaged food into the fixed cartridge. The transport cartridge 80 is adapted to removably attach to the fixed cartridge such that trays of unpackaged food in the transport cartridge are aligned with the conveyor system to transfer the trays of unpackaged food from the transport cartridge into the fixed cartridge. The transport cartridge 80 generally includes a housing 82 having a front opening, an interior rack 84 for holding trays 36 of unpackaged food in a vertical stack, and a door 86 (shown removed) for covering the front opening of the housing. The door 86 can slide to one side to or can be a panel door that winds around a rotating dowel 88 disposed on top of the housing.

Referring specifically to FIG. 13, at least a portion of a back wall 90 of the housing of the transport cartridge 80 may be removable and/or movable in a direction of the front opening of the housing to simultaneously transfer trays of unpackaged food from the transport cartridge into the fixed cartridge when attached thereto.

Figures 14A, 14B:
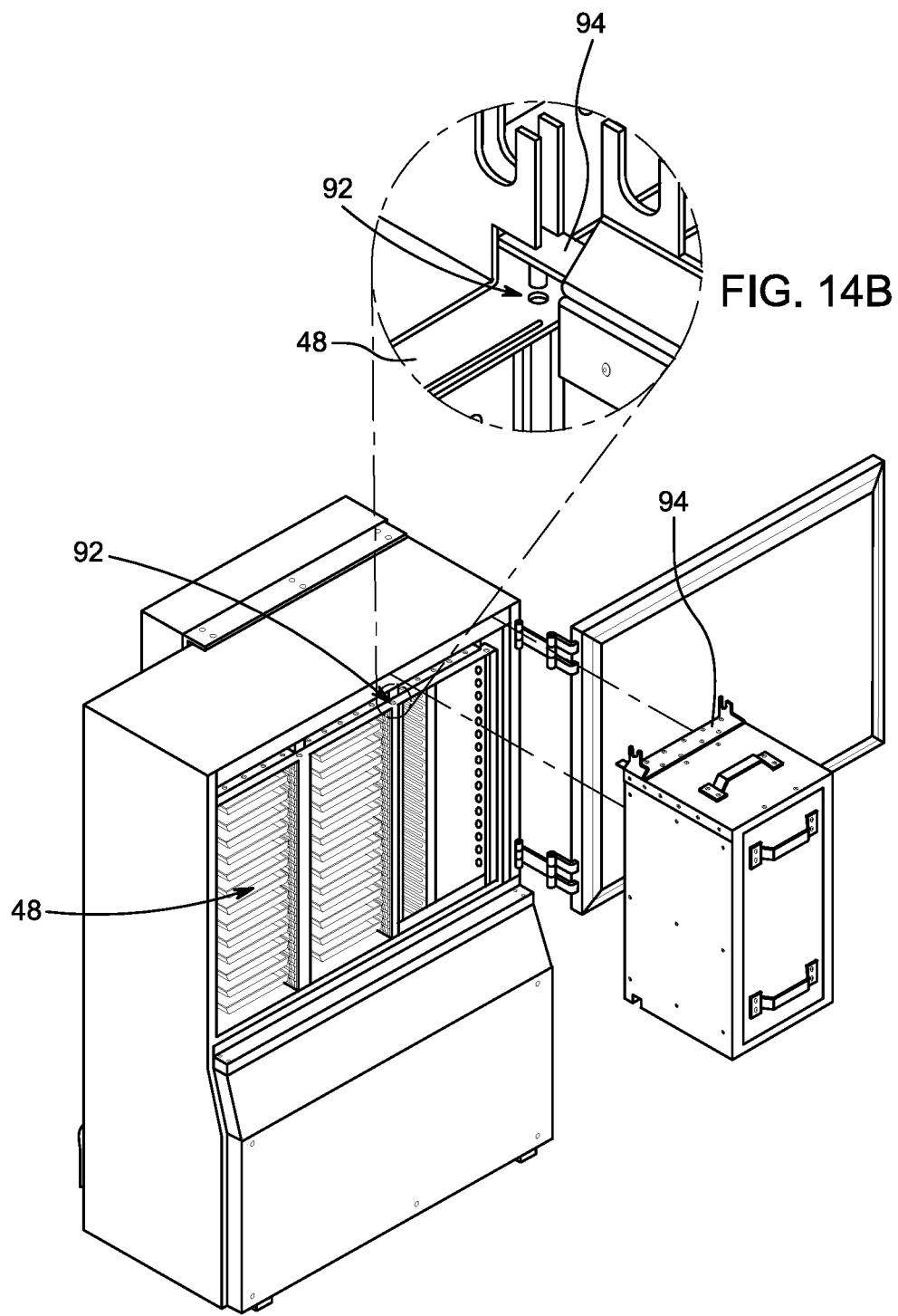
FIG. 14A is a perspective view showing the transport cartridge aligned to be removably attached to the fixed cartridge.
FIG. 14B is a detailed showing an exemplary alignment and engagement feature for removably attaching the transport cartridge to the fixed cartridge.

Referring to FIGS. 14A and 14B, the fixed cartridge 48 may include at least one alignment receiver 92 adapted to receive a corresponding alignment feature 94 on the transport cartridge 80 and/or the transport cartridge may include at least one alignment receiver adapted to receive a corresponding alignment feature on the fixed cartridge. A primary function of the alignment feature(s) and receiver(s) being to align and removably attach the transport cartridge to the fixed cartridge to align the openings in facing contact, and consequently align the trays with the conveyor, to facilitate tray transfer into the fixed cartridge.

The transport cartridge is adapted to be loaded with unpackaged food at a location remote from the vending machine. For example, the vending machine system allow a local restaurant or food item supplier to operate and stock the vending machine. The transport cartridges are configured to be removed from the vending machine, and therefore can be washed and loaded at the restaurant under sanitary conditions as the food is made, closed and sealed for transport to the vending machine, and installed within the vending machine by interfacing with the fixed cartridges, thereby eliminating any intermediate handling of the food items. In an exemplary configuration, the vending machine is configured to sell pizza by the splice. A local pizzeria can put the machine into service anywhere as a convenience to customers. The pizza can be made at the pizzeria and loaded into the transport cartridges. The transport cartridges are transported in a closed sanitary condition to the vending machine, where the trays are loaded into the fixed cartridges without any intermediate food handling.

Food items suitable for use with the present invention include any unpackaged food item having any size or shape. The trays and cartridges can be customized based on the food item to be dispensed. The term "unpackaged" as used herein can mean lacking any form of sealed or unsealed container or protective film. A suitable conveyor oven for use with the present invention provides high-volume processing and generally includes a cooking tunnel having an entrance and exit, a thermal heating source, and conveyor means. The conveyor means may be a continuous open link conveyor belt operable for transporting the food items thru the cooking tunnel. Conveyor belt speed can be customized to adjust cooking time based on the capacity of the thermal heating source, the food items to be heated, the starting temperature of the food items, etc.

The foregoing description provides embodiments of the invention by way of example only. It is envisioned that other embodiments may perform similar functions and/or achieve similar results. Any and all such equivalent embodiments and examples are within the scope of the present invention and are intended to be covered by the appended claims.

What is claimed is:

1. A vending machine system adapted to dispense unpackaged food, comprising:
   a cabinet comprising a door for accessing a cabinet interior;
   a refrigerator disposed within the cabinet interior;
   an oven disposed within the vending machine system;
   at least one delivery chute for delivering heated unpackaged food;
   a payment system;
   an interface for operating the vending machine system;
   a fixed cartridge disposed in the refrigerator, the fixed cartridge comprising a conveyor system for conveying trays of unpackaged food within the fixed cartridge; and
   a transport cartridge for loading trays of unpackaged food into the fixed cartridge, the transport cartridge adapted to removably attach to the fixed cartridge such that trays of unpackaged food in the transport cartridge are aligned with the conveyor system to transfer trays of unpackaged food from the transport cartridge to the conveyor system.

2. The vending machine system of claim 1, wherein the transport cartridge comprises a removable back cover.

3. The vending machine system of claim 1, wherein the transport cartridge is adapted to be loaded with a plurality of food trays at a location remote from the cabinet.

4. The vending machine system of claim 1, wherein the vending machine system further comprises a pusher for ejecting a tray of unpackaged food from within the fixed cartridge to a position exterior of the fixed cartridge.

5. The vending machine system of claim 1, wherein the transport cartridge comprises at least one alignment feature received in a corresponding alignment receiver of the fixed cartridge when the transport cartridge is removably attached to the fixed cartridge.

6. The vending machine system of claim 1, wherein the fixed cartridge comprises:
   a housing having a front opening;
   a door; and
   a mechanism that moves the conveyor system.

7. The vending machine system of claim 1, wherein the transport cartridge comprises:
   a housing having a front opening;
   a door covering the front opening; and
   an interior rack for holding trays of unpackaged food in a vertical stack.

8. The vending machine system of claim 7, wherein the transport cartridge further comprises a rotating dowel disposed adjacent a top of the housing on which the door is wound when retracting the door.

9. The vending machine system of claim 7, wherein at least a portion of a back wall of the housing of the transport cartridge is movable in a direction of the front opening of the housing to simultaneously transfer trays of unpackaged food in the transport cartridge into the fixed cartridge.

10. A system for loading and dispensing pre-baked unpackaged food, comprising:
    a fixed cartridge adapted to be disposed in a refrigerator of a vending machine, the fixed cartridge comprising a conveyor system for conveying trays of unpackaged food within the fixed cartridge, and a mechanism that moves the conveyor system; and
    a transport cartridge adapted to removably attach to the fixed cartridge, the transport cartridge comprising a housing, a door, and an internal rack for holding trays of unpackaged food;
    wherein, when the transport cartridge is removably attached to the fixed cartridge, a front opening of the transport cartridge aligns with a front opening of the fixed cartridge, and wherein the rack of the transport cartridge aligns with the conveyor system of the fixed cartridge such that trays of unpackaged food within the transport cartridge can be transitioned from the rack to the conveyor system.

11. The system of claim 10, wherein the door is a panel door configured to be wound on a dowel to open the front opening of the transport cartridge.

12. The system of claim 10, wherein a total tray capacity of the transport cartridge is less than a total tray capacity of the fixed cartridge.

13. The system of claim 10, wherein the transport cartridge comprises at least one alignment feature adapted to be received in a corresponding alignment receiver of the fixed cartridge when the transport cartridge is removably attached to the fixed cartridge.

14. The system of claim 10, wherein the fixed cartridge further comprises a pusher for ejecting a tray of unpackaged food from within the fixed cartridge to a position exterior of the fixed cartridge.

15. The system of claim 10, wherein at least a portion of a back wall of the housing of the transport cartridge is movable in a direction of the front opening of the housing to simultaneously transfer trays of unpackaged food in the transport cartridge into the fixed cartridge.

16. A method for stocking a vending machine adapted to dispense unpackaged food, comprising the steps of:
    providing a vending machine comprising a fixed cartridge disposed in a refrigerator of the vending machine, the fixed cartridge comprising a conveyor system for conveying trays of unpackaged food within the fixed cartridge, and a mechanism that moves the conveyor system;
    providing a transport cartridge adapted to removably attach to the fixed cartridge, the transport cartridge comprising a housing, a rack for holding trays of unpackaged food, and a mechanism for transitioning the trays of unpackaged food from within the transport cartridge into the fixed cartridge;
    stocking the transport cartridge with trays of unpackaged food at a location remote from a location of the vending machine;
    delivering the stocked transport cartridge to the location of the vending machine;
    attaching the stocked transport cartridge to the fixed cartridge such that a front opening of the transport cartridge aligns with a front opening of the fixed cartridge, and such that the rack of the transport cartridge aligns with the conveyor system of the fixed cartridge such;
    transferring trays of unpackaged food from the rack to the conveyor system; and
    detaching the transport cartridge from the fixed cartridge.

17. The method of claim 16, further comprising the step of, subsequent to the step of attaching the transport cartridge to the fixed cartridge, retracting a panel door covering the front opening of the transport cartridge.

18. The method of claim 16, further comprising the step of, prior to the step of attaching the transport cartridge to the fixed cartridge, the steps of:

opening a vending machine door to access the refrigerator; and opening a refrigerator door to access the fixed cartridge.

19. The method of claim 16, wherein the step of attaching the transport cartridge to the fixed cartridge comprises engaging an alignment feature on the fixed cartridge with an alignment receiver on the transport cartridge.

20. The method of claim 16, wherein the step of transferring trays of unpackaged food from the rack to the conveyor system comprises simultaneously transferring the trays.

\* \* \* \* \*